United States Patent [19]

Bateman et al.

[11] 3,934,221

[45] Jan. 20, 1976

[54] TERRAIN CLOSURE WARNING SYSTEM WITH ALTITUDE RATE SIGNAL CONDITIONING

[75] Inventors: Charles Donald Bateman, Bellevue; Hans Rudolf Muller, Kirkland, both of Wash.

[73] Assignee: Sundstrand Data Control, Inc., Redmond, Wash.

[22] Filed: Mar. 6, 1975

[21] Appl. No.: 556,022

[52] U.S. Cl. ........ 340/27 AT; 73/178 R; 235/150.2; 244/77 D; 343/7 TA; 343/112 CA; 343/112 A
[51] Int. Cl.² ............................................. G01C 5/00
[58] Field of Search ............. 73/178 R, 178 T, 179; 179/1 SA; 235/150.2, 150.22; 244/77 A, 77 D; 340/16 R, 16 M, 16 C, 27, 29, 52 H, 56, 62, 66, 74, 258; 343/5 LS, 7 R, 7 TA, 7 ED, 7 PF, 7.7, 8, 9, 12 R, 12 A, 108 R, 112 A, 112 CA, 5

[56] References Cited
UNITED STATES PATENTS

| | | | |
|---|---|---|---|
| 2,702,342 | 2/1955 | Korman | 343/112 CA X |
| 2,735,081 | 2/1956 | Hosford | 340/27 R |
| 2,851,120 | 9/1958 | Fogiel | 343/112 CA X |
| 2,930,035 | 3/1960 | Altekruse | 343/7 TA |
| 2,931,221 | 4/1960 | Rusk | 73/179 |
| 3,077,557 | 2/1963 | Joline et al. | 244/77 D X |
| 3,093,807 | 6/1963 | Crane et al. | 73/179 X |
| 3,140,483 | 7/1964 | Sikora et al. | 343/7 TA |
| 3,210,760 | 10/1965 | Olson et al. | 343/7 TA |
| 3,245,076 | 4/1966 | LeTilley et al. | 343/7 TA X |
| 3,248,728 | 4/1966 | Garfield et al. | 343/7 TA X |
| 3,510,092 | 5/1970 | Hendirck et al. | 244/77 D |
| 3,715,718 | 2/1973 | Astengo | 340/27 R |
| 3,743,221 | 7/1973 | Lykken et al. | 244/77 A |
| 3,776,518 | 10/1973 | Rilett | 343/7 TA X |
| 3,892,373 | 7/1975 | Doniger | 244/77 A |

OTHER PUBLICATIONS

Brantley, James Q., *Radar Offers Solution To Midair Plane Collisions*, Electronics, 11-1954, pp. 146–150.

*Primary Examiner*—Duane A. Reger
*Assistant Examiner*—Stephen G. Kunin
*Attorney, Agent, or Firm*—Ted E. Killingsworth; Michael B. McMurry

[57] ABSTRACT

In an aircraft terrain warning system utilizing a radar altimeter wherein the rate of closure to the terrain is compared with the aircraft's altitude above the terrain to generate a warning signal when the closure rate is excessive for a particular altitude, the closure rate signal is limited and biased depending upon the aircraft's closure rate and configuration in order to significantly increase the time response of the system while at the same time reducing nuisance warnings. The amplitude limit on the closure rate signal, is varied, above a predefined altitude, as a function of the closure rate signal in oreder to provide increased warning times at greater closure rates. Circuitry, responsive to the aircraft's flap positions, is also provided to alter the characteristics of rate limiter so as to provide warning parameters that more accurately reflect operating conditions at lower aircraft speeds.

17 Claims, 7 Drawing Figures

TERRAIN CLOSURE WARNING SYSTEM WITH ALTITUDE RATE SIGNAL CONDITIONING

BACKGROUND OF THE INVENTION

The invention relates to the field of terrain or ground proximity warning systems for aircraft and more particularly to terrain warning systems that generate warning signals as a function of the aircraft's rate of descent as compared to its altitude above the ground.

This invention relates in particular to the prior art ground proximity warning system disclosed in Astengo U.S. Pat. No. 3,715,718 and the application of Bateman Ser. No. 480,727, filed on June 19, 1974, entitled, "Ground Proximity Warning Instrument" both of which are assigned to the assignee of this application. The terrain closure warnings described in Astengo and Bateman use a signal derived from a radar altimeter representing the rate of change in the aircraft altitude above ground where a symmetric rate limiter is utilized to limit the amplitude of this rate signal to the same maximum value for both increasing and decreasing rates of change in the aircraft's altitude above ground. The limited rate signal is then utilized as an input to a complementary filter which serves to remove high frequency components from the radar altitude rate signal.

However, it has been determined that, when an aircraft is flying at a relatively high air speed over undulating terrain having relatively steep slopes, a negative slope i.e. terrain that is sloping downwardly away from the aircraft, will cause the low pass filter to take an appreciable charge having a non-warn polarity. This will have the effect of delaying the warning signal when the aircraft begins to traverse a positive or upwardly sloping terrain due to negative conditioning of the system. At the same time it is extremely important that nuisance warnings be reduced to an absolute minimum since every nuisance warning tends to reduce the aircrew's confidence in the system and hence the value of the system as a safety device. Thus the problem becomes how to increase the sensitivity of the system to avoid the delaying effects of downward slopes while concurrently reducing nuisance warnings to a minimum.

By the same token, it is considered worthwhile to extend the altitude at which the system will respond and at the same time reduce nuisance warnings resulting from rough terrain at these higher altitudes.

SUMMARY OF THE INVENTION

It is, therefore, an object of the invention to condition closure rate signal in order to reduce warning signal delays due to negative slopes and the resulting negative biasing of the warning system.

It is a further object of the invention to provide a circuit for biasing and limiting the altitude rate signal so that the signals generated by negative slopes have substantially less effect on the system than the rate signals generated by positive slopes.

It is an additional object of the invention to provide an altitude rate signal limiter which increases the maximum limit on the rate signal as a function of increasing altitude rate of change signal in the terrain closing direction so as to provide increased warning times at higher rates of terrain closure at greater altitudes.

It is a still further object of the invention to provide a signal limiting circuit having asymmetrical and biasing characteristics along with a variable limitation on the altitude rate signal so as to provide an improved warning characteristic.

The terrain closure warning system includes inputs from both a radar altimeter and a barometric altimeter where both of these inputs are differentiated in order to get a rate of change in radar altitude signal and a rate of change in barometric altitude signal. The radar rate signal is limited by a rate limiter circuit before being applied to a low pass filter element in a complementary filter. The rate of change in barometric altitude signal is applied to the high pass filter portion of the complementary filter whereupon the filtered and limited radar rate signal is combined with the filtered barometric rate of change signal into a combined altitude rate of change signal. This signal is biased and scaled for comparison with a signal from the aircraft's radar altimeter indicating the aircraft's altitude above ground in order to generate the desired warning characteristic. This warning characteristic, or envelope, generally provides for generating a warning signal based on the rate of terrain closure as a function of the aircraft's altitude above ground, i.e. the greater the altitude, the greater the rate of terrain closure must be to trigger a warning.

As indicated before, however, as the aircraft is traversing terrain having a negative slope, the complementary filter will build up a negative charge or bias which will tend to decrease the response of the system to a positive or rising slope. In order to eliminate warning signal delays as the aircraft is traversing at a relatively high rate of speed, terrain with a series of increasing and decreasing slopes, the effect of the negative slope signal on the system must be reduced. This is accomplished in the rate limiting portion of the circuitry by providing the rate limiter with asymmetrical characteristics. In other words the absolute value of maximum permitted amplitude of the radar altitude rate signal generated by a negative slope is reduced as compared to the absolute value of maximum permitted amplitude for the radar rate signal caused by a positive or increasing slope. Also, under certain conditions, it is desirable to bias the rate signal so that even the largest possible signal generated by a negative slope will have the same polarity as signals generated by a positive slope.

Since the delay in the warning signal due to negative slopes presents an appreciable problem only at relatively high aircraft speeds, a means is provided to alter the performance of the rate signal limiter by reducing the bias and the asymmetrical nature of the limit on the signal whenever the aircraft is proceeding at lower speeds. This change in operation is accomplished by causing the rate limiter to respond to signals indicating whether the aircraft's flaps are up or down.

In addition to the asymmetrical limiting of the radar altitude rate signal, the limiter circuit increases the maximum permitted value of the radar rate signal representing terrain closure as a function of increasing closure rates. This provides what is termed a "soft limit" characteristic. Essentially this soft limiting characteristic provides for increasing the altitude at which a signal will be triggered as a function of increasing closure rate. Above a predefined altitude, the greater the closure rate, or radar rate signal, the greater the amplitude of the radar altitude rate signal will be allowed to pass through the rate circuit. The net result of this "soft limit" characteristic will be to provide the crew of the aircraft with improved warning times under conditions of relatively high terrain closure rates. However, it is also considered desirable to limit this soft limiting characteristic above a certain altitude since rough terrain can cause nuisance warnings. As a result, the warning signal is effectively inhibited above an altitude sufficiently great enough so that even very rapid terrain closure rates do not present an immediate threat to the aircraft's safety.

DETAILED DESCRIPTION OF THE INVENTION

Figure 1:
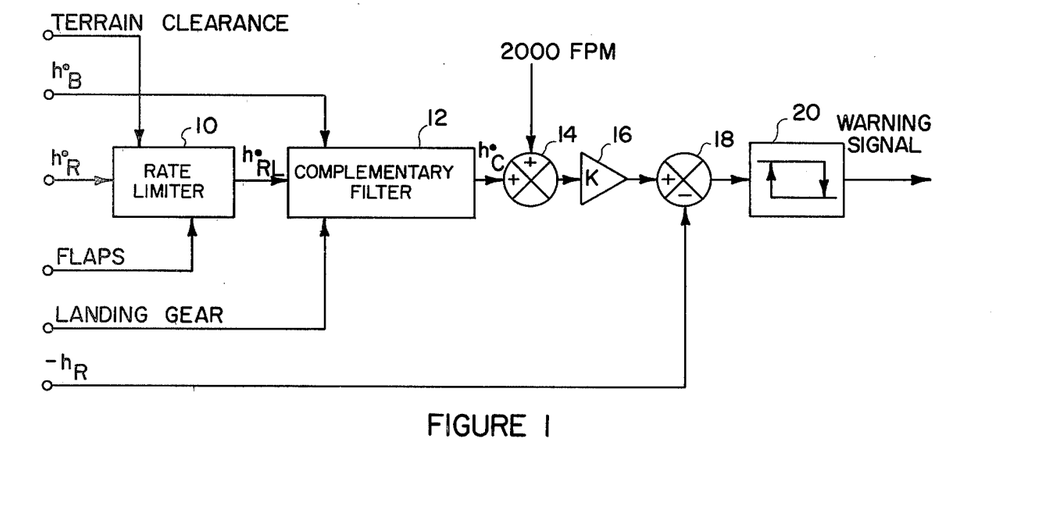
FIG. 1 is a functional block diagram of the terrain warning system.

A functional block diagram of a terrain warning system, similar to that disclosed in Astengo 3,715,718, is provided in FIG. 1. The $\dot{h}_R$ input to the rate limiter 10 represents the altitude rate of change signal derived from a radar altimeter or radio altimeter as it is sometimes called. The output of the rate limiter 10, $\dot{h}_{RL}$, it utilized as one of the inputs to the complementary filter 12. The other input to the complementary filter is the signal $\dot{h}_B$ which represents the rate of change in the aircraft's barometric altitude. The complementary filter 12 filters out the high frequency components of the $\dot{h}_{RL}$ signal and the low frequency components of the $\dot{h}_B$ signal and combines the filtered signals into the combined signal $\dot{h}_C$. Combined with $\dot{h}_C$ is a signal representing an altitude rate of change of 2,000 FPM at the summing junction 14. The biased $\dot{h}_C$ signal is scaled by the scaling amplifier 26 and utilized as input to the summing junction 18. The other input to the summing junction 18 is the $h_R$ signal, received from the radar altimeter, representing the aircraft's altitude above ground. The output of the summing junction 18 is then applied to the comparator 20 which generates a warning signal whenever the output of the comparator 18 is positive.

Figure 2:
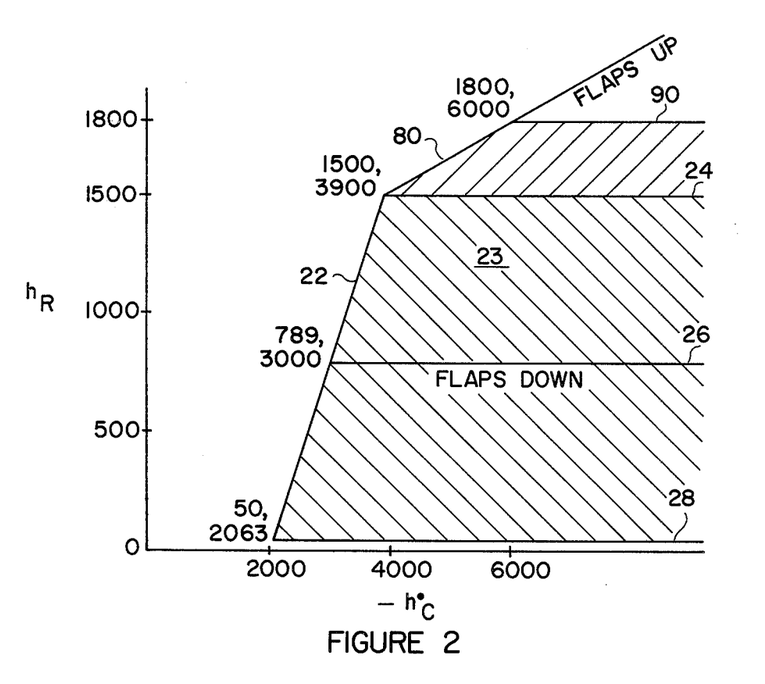
FIG. 2 is a graphical representation of the warning envelope generated by the circuit of FIG. 1.

In FIG. 2 the warning characteristics, or envelope, of the system illustrated in FIG. 1 is presented. The basic warning envelope is to the right of line 22 encompassed by the shaded area 23 of FIG. 2 below line 24. Here, it can be appreciated, that as the combined rate signal $\dot{h}_C$ increases the greater the aircraft's altitude above ground will have to be in order to avoid triggering a warning signal as indicated by the slope of the line 22. Since the amplitude of $\dot{h}_R$ and thus $\dot{h}_C$ is limited by the rate limiter 10, the maximum altitude that the warning signal can be generated is approximately 1500 feet above ground as shown by the line 24. As a result, the rate limiter 10, in combination with the rest of the circuitry of FIG. 1 will produce the warning characteristics bounded by the lines 22 and 24 of FIG. 2.

The rate limiter 10 also has an input that represents the position of the aircraft's flaps. The effect of the flap input to the rate limiter 10 will be to further limit the amplitude of the $\dot{h}_{RL}$ signal providing a maximum altitude for which a warning signal can be generated of approximately 789 feet. This flaps down mode of operation of the terrain warning system is illustrated by the line 26 of FIG. 2. It should be also noted at this point that, in the preferred embodiment of the system, the warning signal is inhibited for altitudes of less than 50 feet, shown in line 28 of FIG. 2 so that a warning signal is not generated just as the aircraft is about to touch down on a runway.

Figure 3:
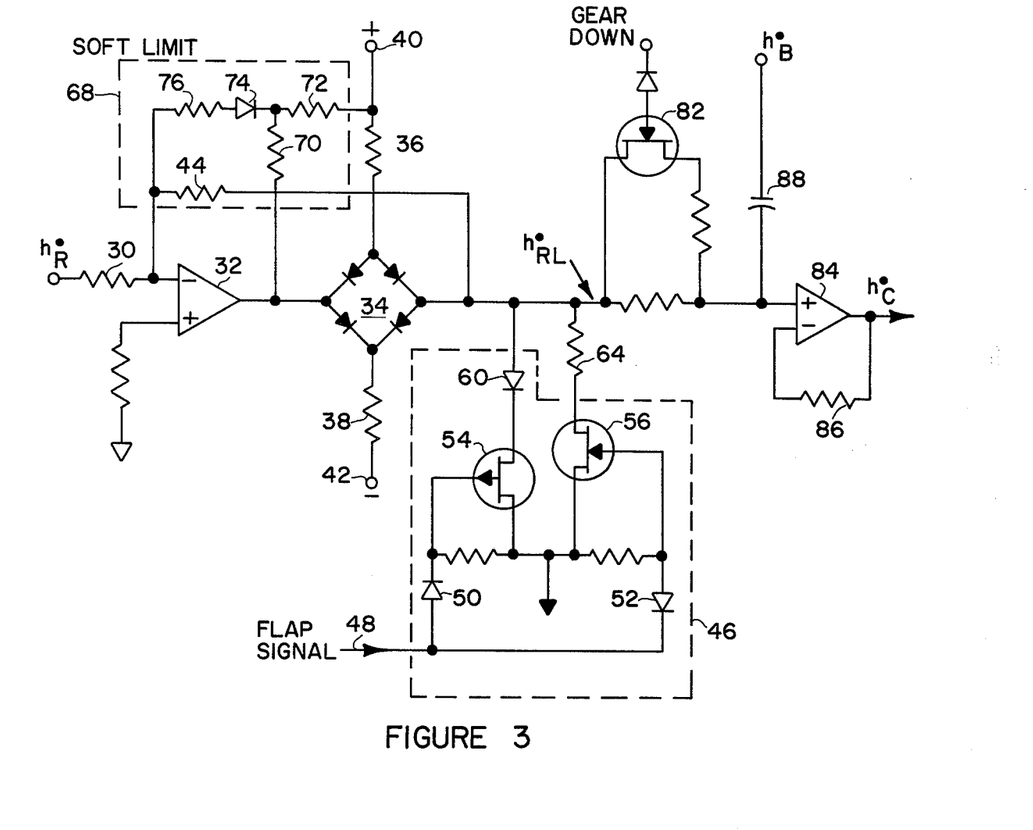
FIG. 3 is a schematic diagram of a first rate limit circuit and the complementary filter.

The first embodiment of the improved rate limiter is illustrated in FIG. 3 of the drawings. The $\dot{h}_R$ signal is input through the resistor 30 to the negative terminal of the operational amplifier 32. The positive terminal of operational amplifier 32 is connected to ground. The bridge rectifier 34 receives the output of the operational amplifier 32 and in turn is biased into the desired operating level by a voltage divider comprising the resistors 36 and 38. A source of positive voltage is applied to terminal 40 and a source of negative voltage is applied to terminal 42. The output of the operational amplifier 32 is further regulated by the feedback circuit, including resistor 44, connected between the negative terminal of operational amplifier 32 and the output of the bridge rectifier 34.

The asymmetric function or output of the rate limiter in FIG. 3 is controlled by the circuitry enclosed in the dashed lines 46. When the aircraft's flaps are up, indicating that the aircraft is in a normal flight configuration, a low signal is generated on line 48. A low voltage on line 48 in combination with the diodes 50 and 52, will serve to switch on the field effect transistor, or FET, 54 and switch off the FET 56. The effect of switching on FET 54 will be to limit the positive output $\dot{h}_{RL}$ of the bridge rectifier 34 to an amplitude corresponding to the line 58 in the operational characteristic shown in FIG. 4 i.e. a signal representing a maximum of 1,000 FPM. By the same token, the permitted maximum amplitude of the negative output $\dot{h}_{RL}$ from the bridge rectifier 34 will have a much greater value due to the diode 60. This negative limitation is illustrated by line 62 of FIG. 4 and corresponds to a descent rate of approximately 3,900 FPM. As a result, the asymmetrical output of the rate limiter, illustrated by lines 58 and 62 of FIG. 4 will be achieved when the flaps are up and the FET 54 is on.

Figure 4:
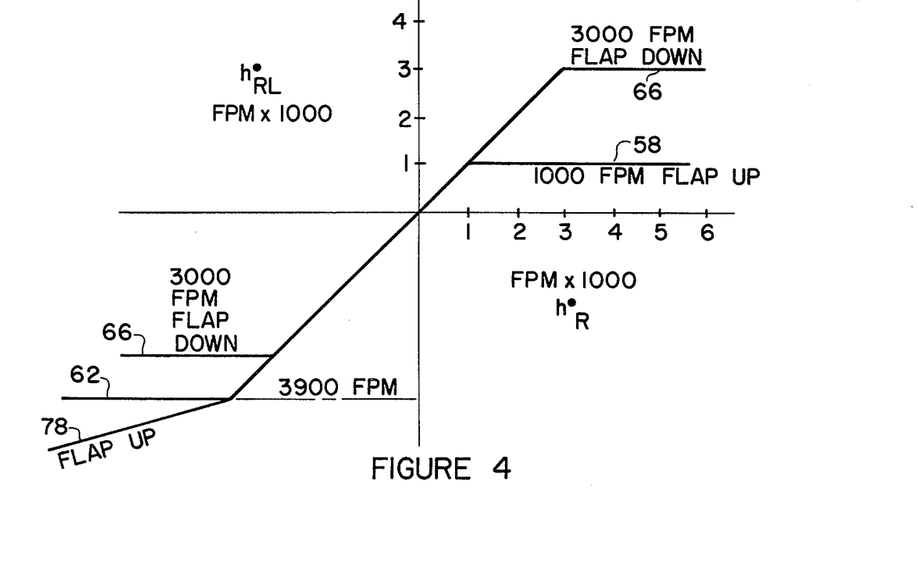
FIG. 4 is a graphical representation of the operating characteristics of the first rate limit circuit.

As indicated before, the asymmetrical characteristic of rate limitation is not required during low speed phases of aircraft operation where the flaps would normally be down. When the flaps are lowered, a high signal will be generated on line 48 switching off FET 54 and turning on FET 56. This will permit current to flow through resistor 64 to ground thus providing the rate limiter with the symmetrical characteristics illustrated by line 66 wherein both the postive and the negative output $\dot{h}_{RL}$ of the bridge rectifier 34 are limited to values that are approximately equal to 3,000 FPM.

In addition to the asymmetrical characteristics of the rate limiter just described, the preferred embodiment of the invention also includes circuit means for providing the "soft limit". It should be noted at this point that the term soft limit does not imply a difference in the quality of the warning signal being generated, but only that the limit on the rate signal can vary with the descent rate so that there is not a "hard" limit on the $\dot{h}_{RL}$ signal above a certain descent rate. The circuitry for implementing the soft limit is shown inside the dashed lines 68 of FIG. 3. The resistors 70 and 72 comprise a voltage divider which varies as a function of the output of the operational amplifier 32. Diode 74 serves to block any input to the negative terminal of the operational amplifier 32 when the output of the operational amplifier 32 is positive. However, when the output of the operational amplifier 32 is negative, corresponding to the lower portion of the graph in FIG. 4, diode 74 will be in a conducting state and in combination with resistor 76 will cause the output of the operational amplifier 32, and therefore the maximum output $h_{RL}$ of the bridge rectifier 34, to increase with an increasing negative $h_R$ signal. This will result in the operating characteristic shown by line 78 of FIG. 4. The increase in the amplitude is reflected in FIG. 2 of the drawings where the line 80 indicates that the maximum warning altitude will increase with an increasing closure rate when the aircraft is in a flaps up condition thereby giving the crew increased warning time under conditions of rapid terrain closure rates.

Also included in the circuitry of FIG. 3 is the FET switch 82 which serves to alter the time constant of the complementary filter 12 in response to the position of the aircraft's landing gear. The operational amplifier 84 along with the feedback connection 86 provides the active element of the complementary filter. The $h_{RL}$ signal and the $h_B$ signal, which is received through capacitor 88, are combined and applied to the positive terminal of the operational amplifier 84. The final output of the operational amplifier 84 is the $h_C$ signal which is applied to the summing junction 14 of FIG. 1.

It should also be understood that the asymmetric characteristics of the rate limiter 10 will affect the dynamic characteristics of the terrain warning system, but will have no effect on the warning envelope as illustrated in FIG. 2. The soft limit on the other hand, directly affects the characteristics of the warning envelope of FIG. 2 by increasing the altitudes at which a warning may be generated as a function of increasing terrain closure rates.

Figure 5:
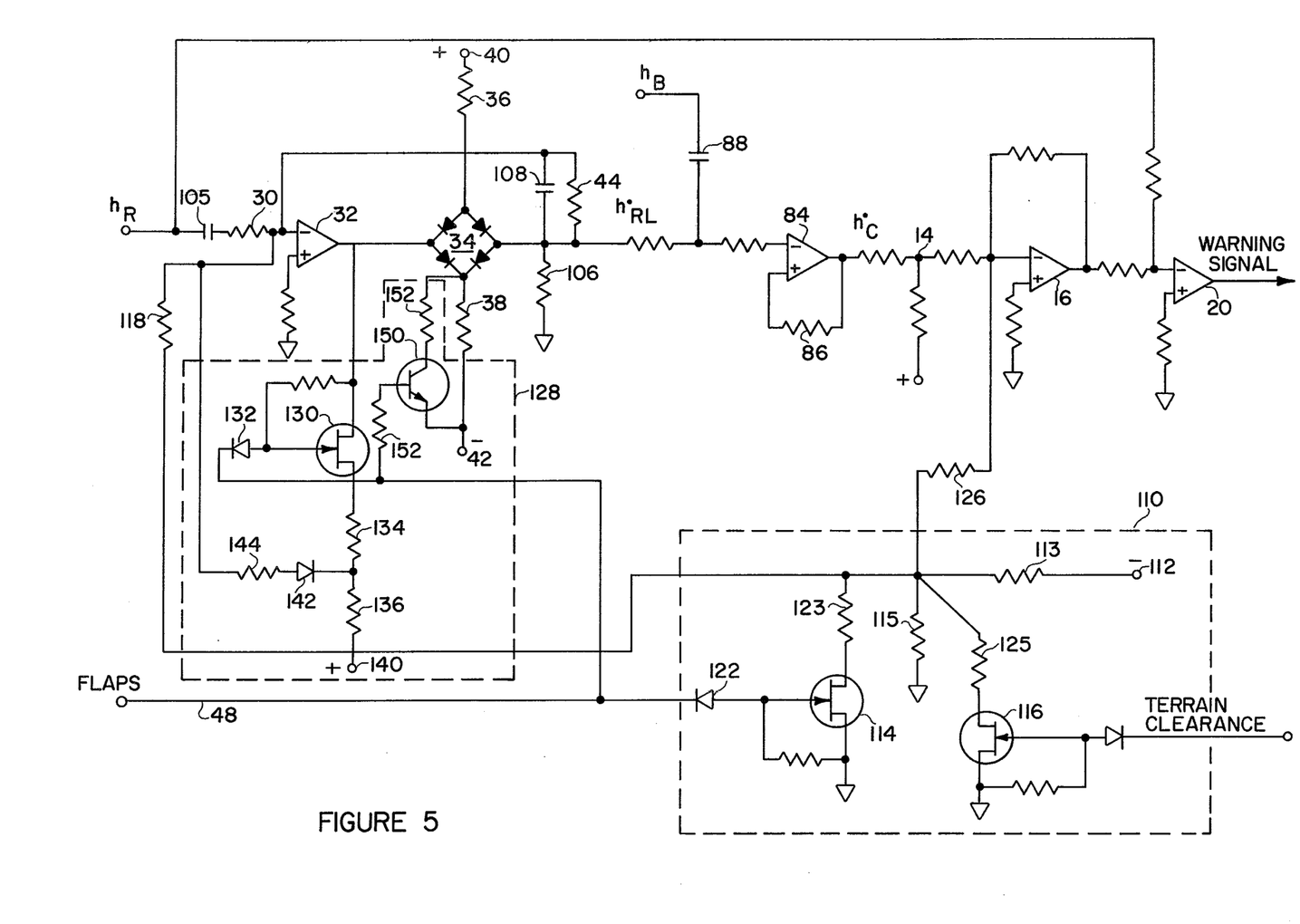
FIG. 5 is a schematic diagram of a second rate limit circuit and the complementary filter.
Figure 6:
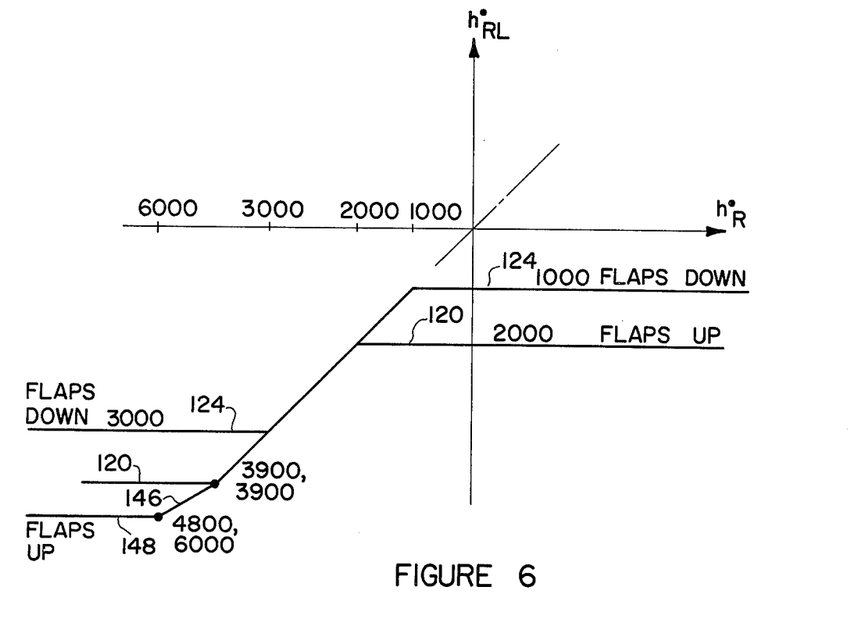
FIG. 6 is a graphical representation of the operating characteristics of the second rate limit circuit.

The second embodiment of the invention is implemented by the circuit shown in FIG. 5 and has the operating characteristics set forth in the graph of FIG. 6. For purposes of clarity, the circuit elements that correspond to the circuit elements in the first embodiment of FIG. 3 are indicated by the same reference numerals. In addition, the circuit in FIG. 5 includes all of the circuit elements necessary to implement the block diagram of FIG. 1 including the scaling amplifier 16 and the comparator 20.

One of the basic purposes of the circuit shown in FIG. 5 is to provide the warning characteristic of FIG. 2 bounded by the lines 22, 80 and 90. The operating characteristics of the circuit in FIG. 5 are the same as the operating characteristics of the circuit in FIG. 3 in that they both impose a soft limit on the rate signal at the point corresponding to an altitude of approximately 1500 feet and a descent rate of 3,900 feet per minute. However, the circuit of FIG. 5 additionally places another hard limit on the rate signal at an altitude of approximately 1,800 feet and at a descent rate of approximately 4,800 feet per minute. This provides a somewhat greater warning time at altitudes of between 1,500 and 1,800 feet above the ground for especially rapid descent rates but at the same time eliminates any warning from the terrain closure mode at altitudes above 1,800 feet in order to reduce nuisance warnings. The rate limiting portion of the circuitry in FIG. 5 also has the operating characteristic shown in the graph of FIG. 6. As is indicated in FIG. 6, the operating characteristic of the rate limiter is biased downwardly so that the output of the rate limiter is entirely in the negative portion of the graph. This means that the maximum voltage of $h_{RL}$ produced by a negative terrain slope will be negative and similarly the maximum voltage of $h_{RL}$ produced by a positive or upwardly sloping terrain will be a corresponding greater negative voltage. The primary value of this asymmetrical limiting of the rate signal is to provide the terrain warning system with a significantly faster response time than provided in the prior art specifically, Astengo 3,715,718. This response rate is generally even greater than that provided by the improved circuitry of FIG. 3. One reason the circuit of FIG. 5 is potentially more responsive is due to the fact that the circuitry in FIG. 3 is inherently unable to bias the operating characteristic of the rate limiter below zero thus limiting the possible compensation for negative sloping terrain.

Figure 7:
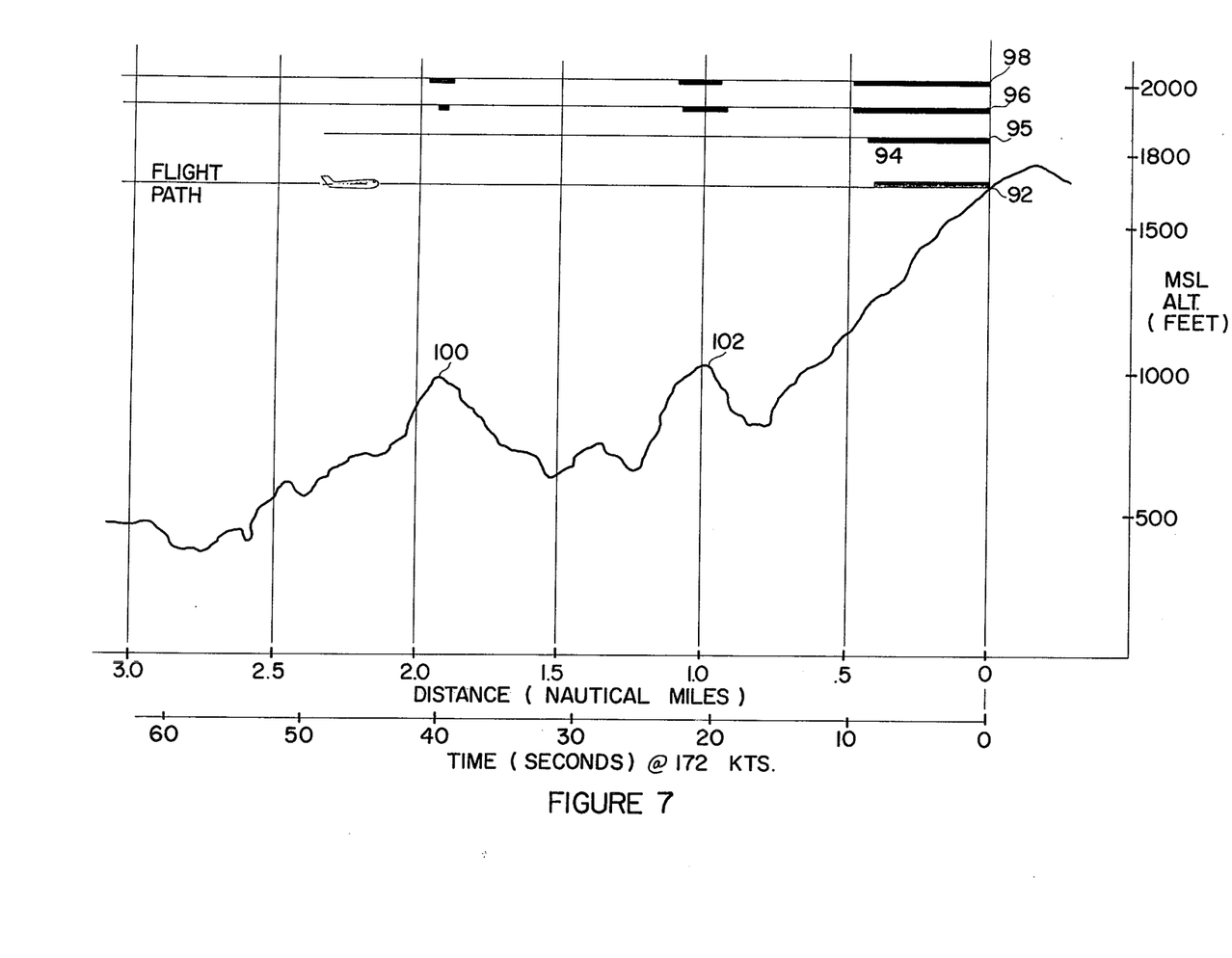
FIG. 7 is an illustration of an aircraft flight profile over terrain with an indication when warnings are generated.

The relative responses of the circuits in FIGS. 3 and 5 are illustrated by the flight profile shown in FIG. 7. The vertical axis of FIG. 7 represents the altitude of both the terrain and of the aircraft above sea level. The horizontal axis represents both the distance from a point of impact 92 and the time till impact for an aircraft with a ground speed of approximately 172 knots. It is the purpose of the terrain profile of FIG. 7 to illustrate the operation of the system for an aircraft in a level flight over undulating terrain which is gradually increasing in height until the aircraft is in danger of actually impacting the highest hill at point 92. The horizontal bar 94 indicates the duration of the warning time for the prior art systems. The horizontal bar 95 represents the response of the circuit of FIG. 3, and the bars 96 and 98 indicate the warning times generated by the circuit in FIG. 5. Bar 98 represents the circuit of FIG. 5 having a soft warning as shown by line 80 of FIG. 2 which extends upwardly and is effective to essentially the maximum range of the radio altimeter. Bar 96, on the other hand, represents the circuit of FIG. 5 having a second hard limit imposed upon it represented by line 90 of FIG. 2.

As the aircraft passes over the first hill 100, the prior art systems represented by bar 94 and the circuit of FIG. 3 represented by this the bar 95 are not able to react quickly enough to generate a warning signal whereas the improved systems of FIG. 5 are able to generate short warning signals. The second hill 102 will again cause the system of FIG. 5 to produce a short warning signal. As the aircraft is approaching the point of impact 92, the improved system of FIG. 5 represented by bar 98 and 96 will provide a warning time of approximately 1 second before the prior system represented by bar 94 or the system of FIg. 3 represented by bar 95. It will be appreciated that this one second difference may very well, under certan circumstances, provide the difference between a safe recovery and an impact into the terrain. Of course it will be recognized that various terrain profiles and flight patterns will provide an almost infinite number of different operating circumstances, but the illustration of FIG. 7 should give some indication of the improved response of the terrain closure warning system with the use of an asymmetrical limiting of the rate signal. It also should be noted that circuit of FIG. 5 would in his case have given the aircrew a warning about 22 seconds before impact and in the case of the system having the soft warning, bar 98, a short warning would have been generated about 40 seconds before impact.

The circuit of FIG. 5 receives the $\dot{h}_R$ signal from the aircraft's radio altimeter wherein the greater the negative voltage the greater the aircraft's altitude above ground. The capacitor 105 and the resistor 30 serve to differentiate this signal into the $\dot{h}_R$ that represents the aircraft's rate of ascent or descent from the ground. As in the circuit of FIG. 3 the $\dot{h}_R$ signal is input to the operational amplifier 32 which cooperates with the bridge rectifier 34 to limit the amplitude of the $\dot{h}_R$ signal. The resistor 106 provides essentially the same function in limiting the amplitude of the $\dot{h}_R$ signal as the resistor 64 in FIG. 3 in that it cooperates with the bridge rectifier to limit the output voltage of the bridge rectifier 34. As in FIG. 3, the output of the operational amplifier 32 is regulated by the feedback circuit which includes the resistor 44 and the capacitor 108. In order to provide the biased asymmetrical operating characteristics shown in FIG. 6, the circuit encompassed by the dashed line 110 is provided. Here the negative voltage source 112 and resistors 113, 115 and 118 cooperate to provide a negative bias voltage to the negative input terminal of the operational amplifier 32. When the aircraft's flaps are up, the FET 114 will be off resulting in a bias voltage being applied to the negative terminal of the operational amplifier 32 which will approximate 3,000 feet per minute. This will result in the operating characteristic represented by lines 120 in FIG. 6 where the upper limit of the $\dot{h}_{RL}$ signal is limited to approximately 2,000 feet per minute and the lower limit is limited to approximately 3,900 feet per minute. In a flaps down configuration, a positive signal is transmitted by line 48 through the diode 122 switching on the FET 114. This will serve to reduce the magnitude of the negative voltage being applied to the negative terminal of the operational amplifier 32 by permitting current to flow through resistor 123 thus reducing the bias voltage on the $\dot{h}_R$ signal. The flaps down operating characteristic of FIG. 5 is indicated by the lines 124 in FIG. 6 wherein the $\dot{h}_{RL}$ signals are limited to 1,000 and 3,000 feet per minute thereby having the effect of reducing the sensitivity of the system in low level flight. The reduction in sensitivity at this point is particularly useful in that it tends to reduce nuisance warnings. The function of the second FET 116 is to respond to a signal from the terrain clearance warning mode of an integrated ground proximity warning system. The terrain clearance warning mode is set forth in detail in Bateman Ser. No. 480,727 filed on June 19, 1974 but, briefly, it functions by generating a warning signal whenever the aircraft is too close to the ground under certain operating conditions. The switching on of the FET 116 in response to the terrain clearance signal has the effect of further reducing the bias voltage on the negative terminal of the operational amplifier 32 by permitting additional current to flow through resistor 125. This reduction in the bias voltage will reduce the altitude at which a warning can be generated to the extent that no warning will be generated, thus, in effect, shutting off this mode.

Since a bias voltage is being applied to the negative terminal of the operational amplifier 32, it is necessary to remove this bias voltage after the rate signal $\dot{h}_{RL}$ has been suitably limited in order to have the system perform properly. Applying the bias voltage from the circuit 110 through the resistor 126 to the negative terminal of the scaling amplifier 16 removes the bias voltage from the $\dot{h}_C$ signal so that it may be scaled appropriately and combined with the $\dot{h}_R$ signal in the comparator 20.

In order to get the soft and hard warnings defined by lines 80 and 90 of FIG. 2, the circuit enclosed by the dashed lines 128 is included in FIG. 5. The basic purpose of this circuit is to increase the output of the rate limiter as a function of increasing rate signal until a predefined rate signal has been reached whereupon the hard limit is reimposed. To this end, the circuit encompassed by the dashed lines 128 includes a feedback loop for the operational amplifier 32. This feed-back loop is composed of the FET 130, the diode 132, the resistors 134 and 136, the positive voltage source 140, the diode 142, and the resistor 144. FET 130 responds to the flaps up signal transmitted through diode 132 from line 48 by switching on thereby closing the feedback loop for the operational amplifier 32. Even though the FET 130 is closed in a conducting state, the second feedback loop around the amplifier 32 will only begin to conduct when the $\dot{h}_R$ signal is sufficiently negative to overcome the voltage generated by the voltage divider composed of the resistors 136 and 134. This will occur when $\dot{h}_R$ has a value which is equivalent to a closure rate of approximately 3,900 feet per minute. It is at this point that the soft warning begins to take effect corresponding to line 80 of FIG. 2 and the portion 146 of the operating characteristic in FIG. 6. In order to reimpose the hard limit, defined by line 90 of FIG. 2 and line 148 of FIG. 6, the transistor 150 and resistance 152 are connected in parallel between the negative voltage source 42 and the diode rectifier 34. The transistor 150 is also responsive to the flap signal on line 48 and, in effect, serves to impose a new lower limit on the voltage output of the rate limiter. Since resistor 152 has smaller value than resistor 38, the opening of transistor 150 will permit more current to be produced by the rate limiter, thus increasing the effective limit on its output. The maximum output of the rate limiter then becomes equal to approximately 6,000 feet per minute corresponding to line 148 of FIG. 6 and line 90 of FIG. 2.

Although both preferred embodiments of the invention have been described in terms of specific values for rates and altitudes, it is not intended that the scope of the invention as claimed will be limited to either of these embodiments nor to the specific values disclosed. In addition, it should be recognized that although the invention was described in terms of implementation in an essentially analog device, the concept of utilizing hard and soft limits as illustrated in FIG. 2 could be implemented by a system utilizing digital techniques. Also, the concept of limiting the effects of signals representing an increase in the aircraft's altitude in order to improve the dynamic performance of a terrain warning system, applies equally to digital as well as analog systems.

I claim:

1. In a terrain warning system for aircraft utilizing the comparison of an altitude above ground signal received from a radar altimeter with an altitude rate signal derived from the altitude above ground signal to generate a warning signal indicating excessive terrain closure rates, wherein the improvement comprises:

means for conditioning the altitude rate signal indicating a decrease in altitude; and means operatively connected to said conditioning means for limiting the altitude rate signal indicating an increase in altitude, in relation to the altitude rate signal indicating a decrease in altitude in order to increase the time response of the terrain warning system by decreasing the effects of the altitude rate signal indicating an increase in altitude.

2. The system of claim 1 wherein said conditioning means limits the maximum permitted value of the altitude rate signal indicating a decrease in altitude and wherein said limit means is effective to reduce the maximum permitted value of the altitude rate signal below said limit imposed on the altitude rate signal representing a decrease in altitude.

3. The system of claim 2 wherein said conditioning means includes a signal limiting circuit and said limit means includes a circuit for causing said circuit to operate asymmetrically.

4. The system of claim 2 wherein said asymmetric signal limiting circuit comprises:
a signal amplitude limiting circuit
a circuit operatively connected to said amplitude limiting circuit for varying the amplitude limit of the altitude rate signal depending upon its polarity.

5. The system of claim 4 wherein said asymmetric signal limiting circuit additionally includes a circuit responsive to a flap signal for selectively causing the limit placed on the altitude rate signal to be substantially symmetric with respect to signal polarity.

6. The system of claim 2 additionally including means, responsive to the flight configuration of the aircraft cooperating with said conditioning means, and said limit means for establishing essentially equal limits on the maximum permitted value of the altitude rate signals indicating an increase in altitude and altitude rate signals indicating a decrease in altitude.

7. The system of claim 6 wherein said conditioning means and said limit means are responsive to the flap settings of the aircraft.

8. A limit circuit for limiting the amplitude of signals representing the rate of change in radar altitude in a terrain warning system comprising:
an amplifier responsive to the radar rate signal;
a bridge rectifier operatively connected to said amplifier;
a first feedback circuit connected between said bridge rectifier and said amplifier; and
a bias circuit operatively connected to said bridge rectifier for decreasing the amplitude limit of the radar rate signal having a polarity indicating an increase in altitude.

9. The circuit of claim 8 additionally including a circuit operatively connected to said bias circuit and responsive to a signal representing the flap configuration of the aircraft for causing said biasing circuit to apply substantially equal amplitude limits on the radar rate signals of either polarity.

10. A terrain warning system utilizing an altitude above ground signal and a rate of change in altitude signal for generating a warning signal indicating excessive terrain closure comprising:
biasing means for biasing the altitude rate signal;
limiting means for limiting said biased altitude rate signal;
scaling means operatively connected to said biasing means and said limit means for removing said bias from the altitude rate signal;
comparator means responsive to said scaled altitude rate signal and the altitude signal for generating the warning signal.

11. The warning system of claim 10 additionally including filter means operatively connected between said limit means and said scaling means for filtering said limited altitude rate signal.

12. The system of claim 11 additionally including switch means responsive to a signal representing the aircraft's configuration and operatively connected to said biasing means for altering the bias on said altitude rate signal.

13. The system of claim 12 wherein said limit means includes means for altering the maximum limit on said biased altitude rate signal in response to said aircraft configuration signal.

14. The system of claim 13 including means responsive to a terrain clearance signal for preventing the generation of the warning signal.

15. In a terrain warning system having means for comparing radio altimeter signals and altitude rate of change signals derived from said radio altimeter signals for generating a warning signal and having a limit means for limiting the value of the altitude rate signal, wherein the improvement comprises:
means for biasing the altitude rate signal prior to being inputted into said limit means thereby eliminating delays in the generation of the warning signal due to altitude rate signals indicating an increase in altitude; and
means for removing said bias from the limited altitude rate signal prior to its being input to the comparing means.

16. The system of claim 15 wherein said limit means includes an operational amplifier and a bridge rectifier and said biasing means includes a voltage source operatively connected to the input of said operational amplifier.

17. The system of claim 16 wherein said biasing means is responsive to a flap signal for reducing the amount of bias applied to said operational amplifier when the aircraft's flaps are down.

* * * * *

UNITED STATES PATENT OFFICE
CERTIFICATE OF CORRECTION

Patent No. 3,934,221    Dated January 20, 1976

Inventor(s) Charles Donald Bateman and Hans Rudolf Muller

It is certified that error appears in the above-identified patent and that said Letters Patent are hereby corrected as shown below:

Column 9, claim 4, line 16, delete "2" and substitute --3--.

Signed and Sealed this

Nineteenth Day of February 1980

[SEAL]

Attest:

SIDNEY A. DIAMOND

Attesting Officer    Commissioner of Patents and Trademarks